(12) United States Patent
Illium et al.

(10) Patent No.: US 8,401,741 B2
(45) Date of Patent: *Mar. 19, 2013

(54) HEADLAMP IN AN AUTOMOBILE

(75) Inventors: Justus Illium, Mainz (DE); Torsten Kanning, Eltville/Erbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 510 days.

This patent is subject to a terminal disclaimer.

(21) Appl. No.: 12/376,095

(22) PCT Filed: Jun. 6, 2007

(86) PCT No.: PCT/EP2007/005984
§ 371 (c)(1),
(2), (4) Date: Feb. 2, 2009

(87) PCT Pub. No.: WO2008/014867
PCT Pub. Date: Feb. 7, 2008

(65) Prior Publication Data
US 2010/0008097 A1    Jan. 14, 2010

(30) Foreign Application Priority Data
Aug. 2, 2006 (DE) .......................... 10 2006 036 358

(51) Int. Cl.
*G05D 1/00* (2006.01)
(52) U.S. Cl. ............... 701/49; 701/1; 701/36; 362/273; 362/276; 362/281; 362/293; 362/296.07; 362/297; 362/284; 362/309; 362/329; 362/339; 362/348; 362/424; 362/454; 362/463; 362/464; 362/465; 362/515; 318/266; 318/272; 318/696; 315/73; 315/77; 315/82; 315/83; 340/468; 340/602; 307/10.8

(58) Field of Classification Search ................. 701/1, 36, 701/49; 356/121; 340/468, 602; 381/391; 250/208.1; 360/78.09; 362/273, 276, 281, 362/293, 296.07, 297, 284, 309, 329, 339, 362/348, 424, 454, 463, 464, 465, 515; 318/266, 318/272, 696; 315/73, 77, 82, 83; 307/10.8
See application file for complete search history.

(56) References Cited

U.S. PATENT DOCUMENTS 4,488,207 A * 12/1984 Harmon ........................ 362/231
4,674,013 A *  6/1987 Manzoni ....................... 362/467
(Continued)

FOREIGN PATENT DOCUMENTS

DE     4033574 A1     5/1991
DE     4136613 A1     5/1993
(Continued)

OTHER PUBLICATIONS

German Patent Office, German Search Report for Application No. 102006036358.2, dated Jul. 30, 2007.
(Continued)

*Primary Examiner* — McDieunel Marc
(74) *Attorney, Agent, or Firm* — Ingrassia Fisher & Lorenz, P.C.

(57) ABSTRACT

A headlamp in an automobile, which is rotatable about a yaw axis when negotiating a bend, has a controller for controlling the rotary movement. In order to improve the illumination of a roadway lying in front of an automobile, the controller may take into account a driving profile.

7 Claims, 1 Drawing Sheet

U.S. PATENT DOCUMENTS

| | | | |
|---|---|---|---|
| 5,343,371 A * | 8/1994 | Kobayashi et al. | 362/538 |
| 5,798,911 A | 8/1998 | Josic | |
| 5,837,994 A * | 11/1998 | Stam et al. | 250/208.1 |
| 5,931,572 A | 8/1999 | Gotoh | |
| 6,366,024 B1 * | 4/2002 | Jonner et al. | 315/82 |
| 6,587,573 B1 * | 7/2003 | Stam et al. | 382/104 |
| 6,728,393 B2 * | 4/2004 | Stam et al. | 382/104 |
| 6,728,605 B2 * | 4/2004 | Lash et al. | 701/1 |
| 6,831,809 B2 * | 12/2004 | Kagami et al. | 360/78.09 |
| 6,837,746 B2 | 1/2005 | Okamoto | |
| 7,124,027 B1 * | 10/2006 | Ernst, Jr. et al. | 701/301 |
| 7,429,918 B2 | 9/2008 | Watanabe | |
| 7,446,653 B2 * | 11/2008 | Alvarez Garcia et al. | 340/468 |
| 7,613,327 B2 * | 11/2009 | Stam et al. | 382/104 |
| 2003/0067763 A1 | 4/2003 | Fukawa | |
| 2003/0195694 A1 * | 10/2003 | Kozak et al. | 701/200 |
| 2005/0246096 A1 | 11/2005 | Bracht et al. | |
| 2006/0177089 A1 * | 8/2006 | Greco et al. | 381/391 |
| 2006/0256320 A1 * | 11/2006 | Peterson | 356/121 |
| 2007/0035268 A1 * | 2/2007 | Goto et al. | 318/685 |
| 2010/0149827 A1 * | 6/2010 | Kettern-Kohler | 362/507 |

FOREIGN PATENT DOCUMENTS

| | | |
|---|---|---|
| DE | 19721095 A1 | 11/1997 |
| DE | 19818949 A1 | 11/1999 |
| DE | 10246387 A1 | 4/2003 |
| DE | 10221902 A1 | 11/2003 |
| DE | 10328358 A1 | 3/2004 |
| DE | 202005009252 U1 | 9/2005 |
| DE | 102005009815 A1 | 10/2005 |
| DE | 102004027695 A1 | 11/2005 |
| DE | 102005026684 A1 | 1/2006 |
| DE | 102004042865 A1 | 3/2006 |
| DE | 102004003019 A1 | 8/2008 |
| EP | 0699559 A2 | 3/1996 |
| EP | 1256479 A1 | 11/2002 |
| EP | 1564071 A2 | 8/2005 |
| JP | 7164960 A | 6/1995 |

OTHER PUBLICATIONS

British Patent Office, British Examination Report for Application No. 0900869.9, dated Nov. 23, 2010.

British Patent Office, British Examination Report for Application No. 0900869.9, dated May 4, 2011.

International Searching Authority, International Search Report for Application No. PCT/EP2007/005984, dated Oct. 1, 2007.

* cited by examiner

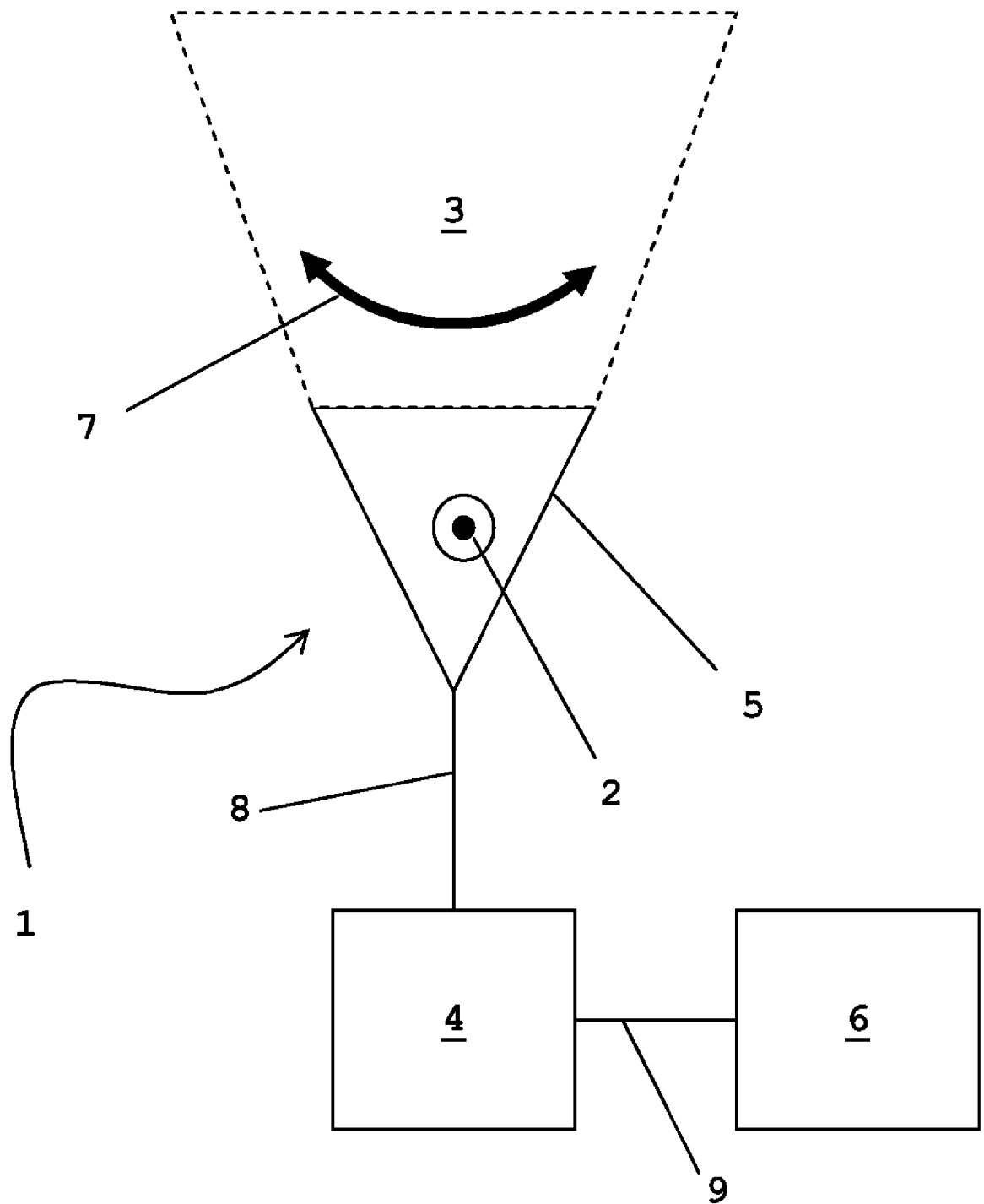

HEADLAMP IN AN AUTOMOBILE

CROSS-REFERENCE TO RELATED APPLICATIONS

This application is a U.S. National-Stage entry under 35 U.S.C. §371 based on International Application No. PCT/EP2007/005984, filed Jun. 6, 2007, which was published under PCT Article 21(2), and claims priority to German Application No. 102006036358.2, filed Aug. 2, 2006, which are all hereby incorporated in their entirety by reference.

TECHNICAL FIELD

The invention relates to a headlamp in an automobile, which is rotatable about a yaw axis when cornering, comprising a controller for controlling the rotary movement.

BACKGROUND

Headlamps, which illuminate the roadway section lying in front of the automobile, and which adapt the illumination during driving, are being increasingly widely used, especially in new and high-quality automobiles. With these headlamps, the emitted light is not only emitted straight in front or in a fixed direction but the headlamp, in particular its reflector, is designed in such a manner that during cornering, areas located obliquely in front of the automobile can also be illuminated to avoid colliding with a non-illuminated obstacle in the bend. To this end, the headlamp or a component thereof is configured in such a manner that a light cone emanating from the headlamp is pivotable or rotatable about a substantially vertically aligned yaw axis. It is hereinafter implied that either the entire headlamp or only a component thereof, such as the reflector for example, or only a lamp inside the reflector, is turned to obtain different directions of emission.

For turning the headlamp, a controller is provided which can be integrated in a central controller of the automobile, wherein, inter alia, signals relating to the vehicle speed and/or a steering-lock angle, which determines the radius of the bend being negotiated, can be fed to the controller. These signals can be used by the controller to calculate the optimum pivot angle of the headlamp for the best possible illumination and an electrical adjusting motor, for example, can be correspondingly driven.

Known from DE 41 36 613 A1 is a gear changing controller in automobiles in which a driving style of the driver, inter alia, rather sporty or rather relaxed, may be determined, for example, by the starting behavior of the automobile, in order to select in this way the optimum gear for the respective driving style.

Furthermore, DE 198 18 949 A1 discloses a control unit for electrical components in an automobile, which is equipped with neural networks in order to allow in this way learnable control of the various functions of the automobile. By this means, in particular fuel can be saved.

Finally, EP 1 256 479 A1 describes a method for driver type detection in which the braking behavior of the respective driver is analyzed and his identity is thus determined. The engine control and/or the gear control can thus be affected according to the known driving style of the identified driver in order to allow an economical driving mode.

The known headlamps are disadvantageous insofar as the rigid dependence of the pivot angle on the vehicle speed and/or the steering-lock angle has the result that not all the requirements of different users of the automobile can be entirely met, in particular with regard to different driving profiles such as, inter alia, a relaxed or a sporty driving mode.

It is at least one object of the invention to provide a headlamp of the type specified initially, which allows optimum illumination of the roadway section lying in front for different users of the automobile. In addition, other objects, desirable features, and characteristics will become apparent from the subsequent summary and detailed description, and the appended claims, taken in conjunction with the accompanying drawings and this background.

SUMMARY

According to the invention, this at least one object other objects, desirable features, and characteristics is achieved whereby the controller can take into account a driving profile.

With a headlamp controller designed in such a manner, the headlamp light cone being pivotable substantially about a vertical yaw axis, it is possible to take into account persons having different driving modes or driving profiles, who successively use the automobile. Particularly younger and inexperienced drivers tend toward a relatively fast driving mode with high cornering speeds and high acceleration values. In such a driving mode, it is necessary to illuminate a bend to be negotiated as broadly as possible to detect any obstacles which may be present in good time. Particularly in the case of older and experienced road users, on the other hand, a relaxed and more defensive driving mode may be observed, in which bends are usually negotiated at substantially lower speeds. In this case, the immediate near area in front of the automobile must be optimally illuminated in order to allow for any visual impairment of the driver. Naturally, other driving profiles are also feasible such as, for example, smooth driving on a longer motorway section or driving in city traffic, which likewise necessitates the greatest possible near illumination of the roadway directly in front of the automobile.

Within the scope of the invention, the different driving profiles of various users may be determined in an arbitrary manner, for example, by comparing the acceleration and deceleration values occurring in each case, the driven cornering speeds, the driven engine speeds, and the like.

The advantage of the invention is that a controller already provided for driving the rotary movement of the headlamp can be designed in a simple manner in terms of hardware and/or software in order to detect different driving profiles and take these into account during the actual turning of the headlamp. In the case of two front headlamps, a common controller is provided for both headlamps.

According to one embodiment, the controller may access one of a plurality of stored driving profiles. To this end, for example, driving profiles for sporty, relaxed, or smooth driving modes are preferably preset in the controller at the factory. If the controller now ascertains, for example, on the basis of the different acceleration values after a short drive that the current driver has a sporty driving profile, the pivoting of the headlamps will be executed in future with reference to this driving profile, i.e., during a rapid cornering, the headlamps will be turned in such a manner that the bend will be illuminated as broadly as possible.

In order to enhance usage comfort, the driver may select a stored driving profile. To this end, before starting to drive, for example, he may select the driving profile most appropriate to him by means of a menu-guided function control on a display in order to pivot the headlamps immediately in the manner appropriate to him.

In order to take into account individual driving modes, a different driving profile may be created for each user. For this, the controller is designed in such a manner that the individual driving mode is analyzed with respect to the previously described parameters over a sufficiently long test phase and the respective pivoting of the headlamps during cornering is determined accordingly. Once the driving profile of the user has been determined, this may be stored in the controller and retrieved again on the next trip.

In order to avoid automatic selection of the individual driving profile, the selection of the driving profile by the controller may also be made with the aid of a personalizing function. For this purpose, an automatic identification of the user is made, for example, by means of a respectively different vehicle key or by means of biometric sensors or by analyzing the driving mode at the beginning of the journey. Subsequently, the controller will automatically allow for the corresponding driving profile when pivoting the rotatable headlamps. In this case, it is also possible to pass on information about the identity of the driver to other controllers of the automobile, for example, to the air conditioning control in order to optimally adapt the automobile to the requirements of the identified driver.

In addition to the pivotable headlamps, some automobiles also have a static turning light which may also be integrated as a dedicated lamp with its own reflector in a front headlamp. The static turning light illuminates toward the side in a fixed angle of up to 110° with respect to the direction of travel. When cornering is initiated, this static turning light is individually drivable with regard to response time and illumination time according to the different driving profiles. This means that in each case, the static turning light is dimmed more rapidly or more slowly and stays activated for different time intervals.

Hereinbefore, the headlamp has been described substantially in relation to an automobile. It is apparent, however, that such a headlamp may also be used in other areas of technology, for example, in an aircraft.

It is understood that the features described previously and still to be described subsequently may be used not only in the respectively specified combination but also in any combination. The scope of the invention is only defined by the claims.

BRIEF DESCRIPTION OF THE DRAWINGS

The present invention will hereinafter be described in conjunction with the following drawing figures, wherein like numerals denote like elements, and.

The single drawing shows the schematic structure of a headlamp according to the invention in an automobile.

DETAILED DESCRIPTION

The following detailed description is merely exemplary in nature and is not intended to limit application and uses. Furthermore, there is no intention to be bound by any theory presented in the preceding background and summary or the following detailed description.

The headlamp 1 is pivotable about a yaw axis 2, as depicted by the double arrow 7, in order to align a light cone 3 in different directions. In this case, either the entire headlamp 1 or only a reflector 5 or a lamp or a shade may be moved relative to the reflector 5. An electric adjusting motor, which is driven by a controller 4, is used for pivoting the headlamp 1, this being indicated by the connecting line 8.

With the aid of sensor signals present in the automobile via data bus architectures, the controller 4 may determine the individual driving mode of the current driver, for example, with regard to different acceleration values, speeds traveled, engine speeds, and cornering speeds. From this the controller 4 may create a driving profile in order to subsequently take into account this driving profile during the actual pivoting of the light cone 3. Inter alia, in a fast driving mode, the light cone 3 is pivoted in such a manner that a bend to be negotiated is illuminated as broadly as possible. In a defensive driving mode, on the other hand, the immediate near area in front of the automobile tends to be illuminated.

In the same way, the different driving profiles may be already stored in the controller 4 or another controller 6 for controlling all the functions of the automobile, whereby a driver can also store an individual driving profile in this controller 6. Subsequently, the controller 4 may directly access such a driving profile, as is indicated by the connecting line 9 between the controllers 4, 6 or this driving profile may be preset for the controller 4 in order to obtain optimal illumination of the roadway.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope o as set forth in the appended claims and their legal equivalents.

The invention claimed is:

1. An automobile headlamp system, comprising:
   a headlamp rotatable about a yaw axis; and
   a controller adapted to control a rotary movement of the headlamp,
   wherein the controller is further adapted to control the rotary movement based at least in part on a driving profile,
   wherein the controller is configured to store a plurality of driving profiles,
   wherein the driving profiles include a fast driving mode and a defensive driving mode, and
   wherein the fast driving mode includes a first illumination area and the defensive driving mode includes a second illumination area, the first illumination area being broader than the second illumination area.

2. The automobile headlamp system according to claim 1, wherein the driving profile is an individual driving profile associated with an individual driver.

3. The automobile headlamp system according to claim 2, wherein the controller is adapted to store the individual driving profile as one of the plurality of driving profiles.

4. The automobile headlamp system according to claim 1, wherein the driving profile is selected with a personalizing function.

5. The automobile headlamp system according to claim 1, further comprising a static turning light that is controllable based at least in part on the driving profile.

6. The automobile headlamp system according to claim 5, wherein the static turning light is individually drivable relative to the headlamp.

7. The automobile headlamp system according to claim 6, wherein the controller is configured to operate the static turning light with a different response time and illumination time relative to the headlamp according to the driving profile.

* * * * *